No. 639,150. Patented Dec. 12, 1899.
T. F. COONEY.
WIRE BROILING PAN.
(Application filed Mar. 11, 1899.)
(No Model.)
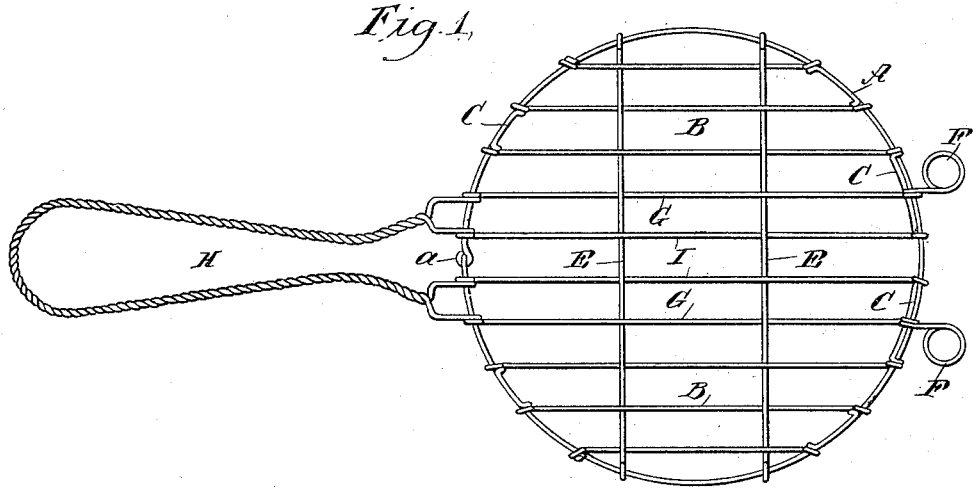
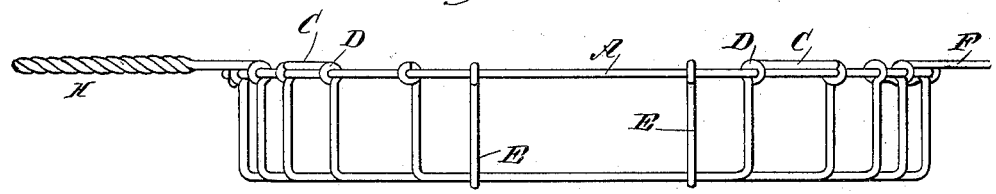
WITNESSES:
Edward Thorpe
H. L. Reynolds.
INVENTOR
Thomas F. Cooney.
BY
Munn
ATTORNEYS.

UNITED STATES PATENT OFFICE.

THOMAS FRANCIS COONEY, OF VERPLANCK, NEW YORK.

WIRE BROILING-PAN.

SPECIFICATION forming part of Letters Patent No. 639,150, dated December 12, 1899.

Application filed March 11, 1899. Serial No. 708,680. (No model.)

*To all whom it may concern:*

Be it known that I, THOMAS FRANCIS COONEY, of Verplanck, in the county of Westchester and State of New York, have invented a new and Improved Wire Broiling-Pan, of which the following is a full, clear, and exact description.

My invention relates to an improvement in broiling-pans; and it consists of a skeleton pan-like dish provided with a handle and constructed of wires which are bent so as to form the outline of the device and secured together by having certain portions bent about other portions.

My invention also comprises novel features, which will be hereinafter described and claimed.

Reference is to be had to the accompanying drawings, forming a part of this specification, in which similar characters of reference indicate corresponding parts in both figures.

Figure 1 is a plan view of my device. Fig. 2 is a side elevation of the same.

One object sought in constructing my device is to produce a broiler which may set down into the stove, being supported upon the stove-top, and which may be covered by any form of cover, so that fat will not spatter out upon the stove.

The device is provided with a rim-wire A, which extends about the upper portion thereof. In the form of my device shown in Figs. 1 and 2 the body is of a circular form, although this form may be modified, if desired, the principles of construction, however, remaining the same.

My device is provided with a handle H, which is formed of two twisted wires G I, which are secured to the rim-wire A and preferably bent about the same. Before being secured to the rim-wire the wires of the handle are separated, and after being secured to the rim-wire are bent downward and extend a distance corresponding to the depth of the device. The wires I are then bent horizontally and carried across to the opposite side of the device, where they are bent upwardly and then secured to the rim-wire by being bent about the same. These wires are separated from each other a distance corresponding to the separation desired for the wires which form the bottom of the device. The wires G after being bent about the rim-wire at the side opposite the handle are then extended outwardly, so as to form a loop F, which will engage the stove-top and prevent the device from dropping into the stove. The other wires I after being secured to the rim-wire at the side opposite the handle are then extended horizontally, as shown at C, until they have been carried to the point where the next bottom wire is desired and are then bent about the rim-wire and carried down and then horizontally, forming additional bottom wires B, as is shown in Fig. 1. Said wires B are then carried upward and secured to the rim-wire A by being bent about the same.

The wires B are alternately carried along the rim-wire and then downward and across in the manner described, forming the remainder of the bottom wires. It will thus be seen that by this construction all of the bottom wires of the device are parts of the same wire, with the exception of the two wires G, which are a part of the other wires which extend through the handle H.

The bottom wires may be held more securely in their proper position by having cross-wires E passed alternately above and below the bottom wires and then secured to the rim-wire A.

I have herein shown the ears F, which support one side of the broiler, as being formed upon the outermost of the two wires which form one side of the handle. This separates the supports a greater distance than if they were formed upon the innermost wires I. This point is, however, immaterial in the construction of the device, as either of the two wires may be provided with this ear. The other wire would, however, be used for forming the bottom wires in the manner described. Where the bottom wires are secured to the rim-wire, it is preferable that the wire should not be carried entirely about the rim-wire, but that a loop C should be formed, which is then bent about the wire, extending a sufficient distance to be securely held thereon.

In using this device it is set down into the stove, and it may be covered by a pot-lid, if desired, and thus any spattering is avoided. It will also prevent the choking of the fire due to the large inrush of cold air, which would otherwise be caused if the opening were not covered in some way.

With this device the broiler may be left in the stove and the meat may be turned as if it were in a frying-pan, and the broiler need not be removed from the stove. By reason of this an even and hot fire is not required, as where an ordinary broiler is used.

Although this device has been illustrated and described as being of a circular form, it is evident that the form of the body thereof may be varied as desired or necessary.

Having thus fully described my invention, I claim as new and desire to secure by Letters Patent—

1. A broiling-pan composed of wire and having a rim-wire, a handle composed of two twisted wires, the wires forming the handle being secured to the rim-wire by passing about it, the wires then extending downward and across to the opposite side, and then upward and around the rim-wire, both ends of one wire extending back and forth in parallel lines between opposite sides of the rim-wire and at increasing distances from the center, the ends of the section thus formed being secured to the rim-wire by clamping about it and having vertical portions at their ends, thereby dropping the central portion and forming a shallow receptacle, substantially as described.

2. A broiling-pan composed of wire and having a rim-wire, a handle composed of two twisted wires, the wires forming the handle being secured to the rim-wire by passing about it, the wires then extending downward and across to the opposite side, and then upward and around the rim-wire, both ends of one wire extending back and forth in parallel lines between opposite sides of the rim-wire and at increasing distances from the center, the ends of the section thus formed being secured to the rim-wire by clamping about it and having vertical portions at their ends, thereby dropping the central portion and forming a shallow receptacle, the ends of the other wire forming the handle extending outward at the side opposite the handle and forming supporting-loops, substantially as described.

THOMAS FRANCIS COONEY.

Witnesses:
  LOUIS H. BLEAKLEY,
  ARTHUR BARNES.